A. BALOGH & L. NAGY.
HORSESHOE.
APPLICATION FILED APR. 18, 1914.
1,106,351.
Patented Aug. 4, 1914.
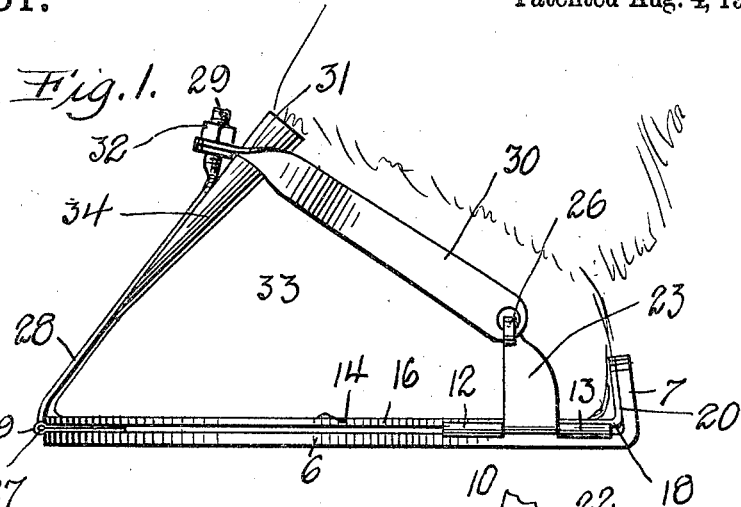
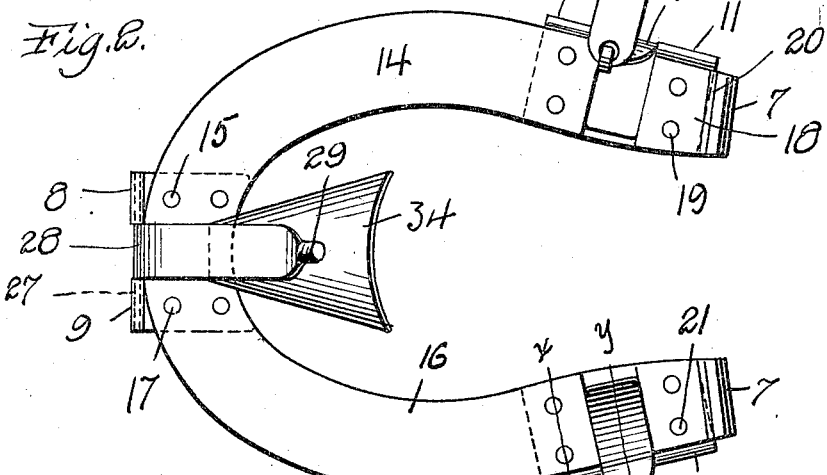
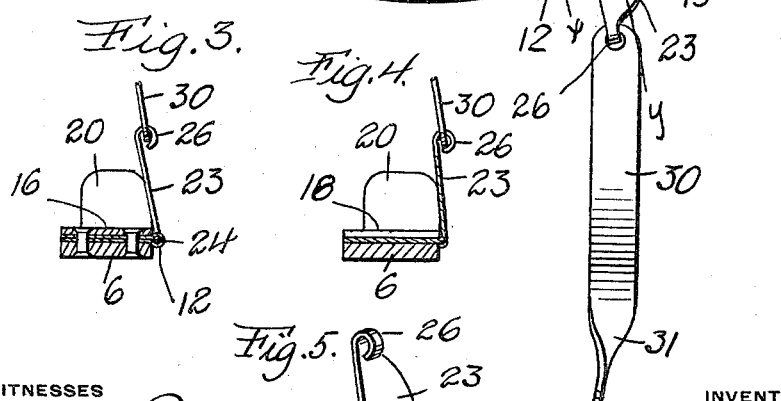
WITNESSES
INVENTORS
L. Nagy, and
A. Balogh.
ATTORNEY
THE NORRIS PETERS CO., PHOTO-LITHO., WASHINGTON, D. C.

UNITED STATES PATENT OFFICE.

ALEX BALOGH AND LAJOS NAGY, OF ST. CATHARINES, ONTARIO, CANADA.

HORSESHOE.

1,106,351.  Specification of Letters Patent.  Patented Aug. 4, 1914.

Application filed April 18, 1914.  Serial No. 832,971.

*To all whom it may concern:*

Be it known that we, ALEX BALOGH and LAJOS NAGY, subjects of the King of Hungary, residing at St. Catharines, in the Province of Ontario and Dominion of Canada, have invented certain new and useful Improvements in Horseshoes, of which the following is a specification, reference being had therein to the accompanying drawing.

This invention relates to horse shoes, and has for its object to provide a shoe of such class with means, in a manner as hereinafter set forth, for detachably connecting the shoe to the hoof of the horse without the employment of nails extending up through the body of the shoe and extending through the hoof of the horse.

Further objects of the invention are to provide a horse shoe for the purpose set forth, which is simple in its construction and arrangement, strong, durable, efficient and convenient in its use, readily set up and inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—Figure 1 is a side elevation of a horse's hoof showing the adaptation therewith of a horse shoe in accordance with this invention, Fig. 2 is a top plan view of a shoe broken away, Fig. 3 is a cross sectional view on line X—X Fig. 2, Fig. 4 is a cross sectional view on line Y—Y Fig. 2, and Fig. 5 is a perspective view illustrating one of the heel coupling members for a retaining strap.

Referring to the drawings in detail, 6 denotes the body of the shoe which is provided at its rear with upwardly extending heels 7. Positioned upon the upper face of the body portion 6 of the shoe are transversely extending loop forming members 8, 9, 10, 11, 12 and 13. The members 8 and 9 are arranged at the toe of the body portion 6, spaced from each other and the loops formed by the side members project forwardly from the toe of the body portion. The members 10 and 11 are arranged upon the body portion 6, at one heel portion thereof and are spaced from each other and with the loops formed by said members 10 and 11 projecting from the said heel portion. The members 12 and 13 are arranged upon the other heel portion of the body portion 6 and are spaced from each other and the loops formed by the said members 12 and 13 project laterally from the said heel portions.

Superposed upon the body 6 and extending from the member 8 to the member 10 as well as being positioned upon said members is a retaining strip 14, which has its edges flush with the edges of the body portion 6, and the said retaining strip 14 has its ends fixedly secured to the members 8 and 10 and to the body portion 6 by holdfast devices 15.

Superposed upon the body 6 and extending from the member 9 to the member 12, as well as being positioned upon said members is a retaining strip 16, which has its edges flush with the edges of the body portion 6, and the said retaining strip 16 has its ends fixedly secured to the members 9 and 12 and to the body portion 6 by holdfast devices 17.

The member 11 is secured to the body portion 6 through the medium of an angle-shaped retaining member 18. The horizontal arm of said member 18 is positioned upon the member 11, and is fixedly secured to said member and to the body portion 6 by holdfast devices 19.

The member 13 is secured to the body portion 6 through the medium of an angle-shaped retaining member 20. The horizontal arm of said member 20 is positioned upon the member 13, and is fixedly secured to the said member and to the body portion 6 by holdfast devices 21.

The upright arms of the members 18 and 20 are positioned against the heel portions 7 of the shoes.

The reference characters 22 and 23 denote a pair of angle-shaped coupling members and each of said members has formed integral therewith a pin 24. The pin 24 of the member 22 is pivotally mounted in the bearings formed by the members 10 and 11 and the pin 24 of the member 23 is pivotally mounted in the bearings formed by the members 12 and 13. The upright arm of each of the members 22 and 23 has its terminus provided with a hook 26.

Pivotally mounted in the bearings formed by the members 8 and 9 is a pin 27 which is formed integral with an angle-shaped coupling member 28. The horizontal arm of said member is of less length than the upright arm, and the said upright arm is normally disposed at an inward inclination and has its free terminus provided with a threaded shank 29, which is offset with respect to the plane of the upright portion of the said coupling member 28.

Connected to the hooks 26 of the coupling members 22 are attaching members 30 which have their forward ends torsionally twisted as at 31 and provided with an opening for the passage of the threaded shank 29. The torsionally twisted end of one attaching member 30 overlaps the torsionally twisted end of the other attaching member 30. The torsionally twisted ends of the members 30 are secured to the threaded shank 29 through the medium of a nut 32.

Interposed between the upright arm or portion of the coupling member 28 and the horse's hoof 33, as well as extending between the torsionally twisted ends 31 of the members 30 is a protector or cushion 34, which tapers in the direction of its length and is convex in transverse section.

The horizontal arms or lower portions of the coupling members 22, 23 and 28 are maintained in position to be flush with the strips 14, 16, and members 18 by the weight of the hoof of the animal when the shoe is positioned against the hoof. When the shoe is positioned against the hoof, the upright arms or portions of the coupling members are swung inwardly to be positioned against the sides of the hoof, after which the members 30 are connected to the threaded shank 29 and by such an arrangement the shoe is detachably connected to the hoof of the animal. Prior to connecting the members 30 to the shank 29, the protector or cushion 34 is positioned.

What we claim is:—

1. A horse shoe comprising a body portion, pivoted coupling members connected to the toe and to the heels of said body portion, said coupling members being angle-shaped, that coupling member pivoted to the toe of the body portion formed with a threaded shank, attaching members loosely connected to the coupling members, connected to the heels of the shoe body and adapted to be positioned upon said shank, and means mounted upon the shank for connecting the toe coupling member to said attaching members whereby the shoe is detachably connected to the hoof of the animal.

2. A horse shoe comprising a body portion, pivoted coupling members connected to the toe and to the heels of said body portion, said coupling members being angle-shaped, that coupling member pivoted to the toe of the body portion formed with a threaded shank, attaching members loosely connected to the coupling members, connected to the heels of the shoe body and adapted to be positioned upon said shank, means mounted upon the shank for connecting the toe coupling member to said attaching members whereby the shoe is detachably connected to the hoof of the animal, and a protector interposed between a portion of the toe coupling member and portions of said attaching members.

3. A horse shoe comprising a body portion, pivoted coupling members connected to the toe and to the heels of said body portion, said coupling members being angle-shaped, that coupling member pivoted to the toe of the body portion formed with a threaded shank, attaching members loosely connected to the coupling members, connected to the heels of the shoe body and adapted to be positioned upon said shank, means mounted upon the shank for connecting the toe coupling member to said attaching members whereby the shoe is detachably connected to the hoof of the animal, and said shoe body provided with upwardly extending heels.

4. A horse shoe comprising a body portion, pivoted coupling members connected to the toe and to the heels of said body portion, said coupling members being angle-shaped, that coupling member pivoted to the toe of the body portion formed with a threaded shank, attaching members loosely connected to the coupling members, connected to the heels of the shoe body and adapted to be positioned upon said shank, means mounted upon the shank for connecting the toe coupling member to said attaching members whereby the shoe is detachably connected to the hoof of the animal, a protector interposed between a portion of the toe coupling member and portions of said attaching members, and said shoe body provided with upwardly extending heels.

In testimony whereof we affix our signatures in the presence of two witnesses.

ALEX BALOGH.
LAJOS NAGY.

Witnesses:
NICOLAUS ZUHASZ,
JOZSEF MARKOTÓ.

Copies of this patent may be obtained for five cents each, by addressing the "Commissioner of Patents, Washington, D. C."